United States Patent
Urch et al.

(10) Patent No.: US 10,435,766 B2
(45) Date of Patent: Oct. 8, 2019

(54) REMOVAL OF RADIONUCLIDES FROM MIXTURES

(71) Applicant: BASF SE, Ludwigshafen (DE)

(72) Inventors: Henning Urch, Ludwigshafen (DE); Christian Rein, Manning (AU); Neil Jeffrey Fitzmaurice, Brighton East (AU); Graham Robert Orr, Boxhill (AU); David Redfern, Surrey Hills (AU)

(73) Assignee: BASF SE, Ludwigshafen (DE)

( * ) Notice: Subject to any disclaimer, the term of this patent is extended or adjusted under 35 U.S.C. 154(b) by 10 days.

(21) Appl. No.: 15/546,086

(22) PCT Filed: Jan. 25, 2016

(86) PCT No.: PCT/EP2016/051403
§ 371 (c)(1),
(2) Date: Jul. 25, 2017

(87) PCT Pub. No.: WO2016/120183
PCT Pub. Date: Aug. 4, 2016

(65) Prior Publication Data
US 2018/0010208 A1     Jan. 11, 2018

(30) Foreign Application Priority Data
Jan. 26, 2015 (EP) .................................. 15152492

(51) Int. Cl.
| | |
|---|---|
| *C22B 3/08* | (2006.01) |
| *C22B 60/02* | (2006.01) |
| *G21C 19/46* | (2006.01) |
| *G21F 9/30* | (2006.01) |
| *C02F 1/26* | (2006.01) |
| *C22B 3/16* | (2006.01) |
| *G21F 9/12* | (2006.01) |
| *C22B 1/00* | (2006.01) |
| *G21F 9/00* | (2006.01) |
| *C02F 101/22* | (2006.01) |
| *C02F 103/16* | (2006.01) |

(52) U.S. Cl.
CPC .................. *C22B 3/08* (2013.01); *C02F 1/26* (2013.01); *C22B 1/00* (2013.01); *C22B 3/165* (2013.01); *C22B 60/0226* (2013.01); *G21C 19/46* (2013.01); *G21F 9/007* (2013.01); *G21F 9/125* (2013.01); *G21F 9/30* (2013.01); *C02F 2101/22* (2013.01); *C02F 2103/16* (2013.01); *Y02P 10/238* (2015.11); *Y02W 30/883* (2015.05)

(58) Field of Classification Search
CPC ....... C22B 2/08; C22B 3/1616; C22B 3/1625; C22B 7/007; C22B 60/0226; C22B 3/08; C02F 1/26; G21C 19/46; G21F 9/007; G21F 9/04; G21F 9/28
See application file for complete search history.

(56) References Cited

U.S. PATENT DOCUMENTS

| | | | |
|---|---|---|---|
| 4,120,935 A | 10/1978 | Fountain et al. | |
| 4,194,514 A * | 3/1980 | Campbell | A24B 15/24 131/352 |
| 5,342,449 A | 8/1994 | Holbein et al. | |
| 5,494,649 A | 2/1996 | Fristad et al. | |
| 5,505,925 A | 4/1996 | Fristad | |
| 5,660,806 A | 8/1997 | Fristad et al. | |
| 5,744,107 A | 4/1998 | Fristad et al. | |
| 5,785,935 A | 7/1998 | Fristad et al. | |
| 8,987,542 B2 | 3/2015 | Sekine et al. | |
| 2004/0129636 A1 | 7/2004 | Monzyk et al. | |
| 2009/0078087 A1 | 3/2009 | Heidenfelder et al. | |
| 2010/0018347 A1 | 1/2010 | Holden et al. | |
| 2010/0155330 A1* | 6/2010 | Burba | C02F 1/281 210/638 |
| 2011/0217222 A1 | 9/2011 | Heidenfelder et al. | |
| 2012/0298586 A1* | 11/2012 | Grandbois | C22B 3/42 210/670 |
| 2013/0017613 A1* | 1/2013 | Kaminski | B01D 15/1871 436/79 |
| 2013/0237741 A1 | 9/2013 | Sekine et al. | |
| 2014/0338696 A1 | 11/2014 | Berthold et al. | |

FOREIGN PATENT DOCUMENTS

| | | |
|---|---|---|
| CL | 197800553 | 8/1978 |
| CL | 197900305 | 5/1979 |
| CL | 200700055 | 1/2007 |
| CN | 103137231 A | 6/2013 |
| DE | 10 2013 102 331 B3 | 7/2014 |
| EP | 2 528 063 A2 | 11/2012 |
| WO | 2007/099119 A1 | 9/2007 |

OTHER PUBLICATIONS

International Search Report dated Mar. 15, 2016 in PCT/EP2016/051403 filed Jan. 25, 2016.
International Preliminary Report on Patentability dated Jul. 27, 2017 in PCT/EP2016/051403 (submitting English translation only).
Resolution de notification de respuesta pericial de aceptacion, fecha de solicitud Jul. 25, 2017, Numero de solicitud patente de invencion PCT/2017-001900.
Office Action dated Jul. 19, 2019, in Russian Patent Application No. 20170130184, filed Jan. 25, 2016.

* cited by examiner

*Primary Examiner* — Tima M. McGuthry-Banks
(74) *Attorney, Agent, or Firm* — Oblon, McClelland, Maier & Neustadt, L.L.P.

(57) ABSTRACT

The present invention relates to a method of separating radioactive elements from a mixture, wherein the mixture is treated with at least one alkanesulfonic acid and at least one further acid, selected from the group consisting of hydrochloric acid, nitric acid, amidosulfonic acid and mixtures thereof and also the use of at least one alkanesulfonic acid and at least one further acid for separating radioactive elements from mixtures comprising these.

12 Claims, No Drawings

REMOVAL OF RADIONUCLIDES FROM MIXTURES

The present invention relates to a method of separating radioactive elements from a mixture, wherein the mixture is treated with at least one alkanesulfonic acid and at least one further acid, selected from the group consisting of hydrochloric acid, nitric acid, amidosulfonic acid and mixtures thereof and also the use of at least one alkanesulfonic acid and at least one further acid selected from the group consisting of hydrochloric acid, nitric acid, amidosulfonic acid and mixtures thereof for separating radioactive elements from mixtures comprising these.

For the handling or processing of ores or ore concentrates, it is necessary for the concentration of various radioactive metal cations present in the ores or ore concentrates to be at a very low value in order to avoid negative effects on the health of persons coming into contact with the ore or ore concentrate.

Various methods of treating mixtures comprising metal compounds or treating ores or ore concentrates are known from the prior art.

US 2004/0129636 A1 discloses a method of separating metal cations, in particular of compounds comprising chromium(VI) cations, from corresponding mixtures by liquid-liquid extraction. An aqueous composition comprising at least one tertiary amine is used as extractant for this purpose.

WO 2007/099119 A1 discloses a process for the acid digestion of metal-comprising compounds. For this purpose, a corresponding mixture is treated with an aqueous leachant, where the aqueous leachant comprises an alkanesulfonic acid and optionally sulfuric acid and/or a surfactant and/or a mixture of an alkanesulfonic acid salt and sulfuric acid and also optionally a surfactant. According to this document, it is possible to digest mixtures comprising copper, zinc, lanthanides, titanium, calcium difluoride, lead, molybdenum, antimony, bismuth, mercury, cobalt, nickel, aluminum, lanthanum or uranium.

It is an object of the present invention to provide, compared to the prior art, a method by means of which the concentration of radioactive elements in mixtures comprising these, for example ores or ore concentrates, can be significantly reduced. In particular, the method of the invention should make it possible to decrease the concentration of the corresponding radioactive elements to a value which allows the mixtures which have been treated according to the invention to be utilized commercially.

These objects are achieved by the method according to the invention of separating radioactive elements from a mixture, wherein the mixture is treated with at least one alkanesulfonic acid and at least one further acid selected from the group consisting of hydrochloric acid, nitric acid, amidosulfonic acid and mixtures thereof.

The objects are likewise achieved by the use according to the invention of at least one alkanesulfonic acid and at least one further acid selected from the group consisting of hydrochloric acid, nitric acid, amidosulfonic acid and mixtures thereof for separating radioactive elements from mixtures comprising these.

An advantage of the process of the invention is that the treatment of mixtures, in particular of ores, with at least one alkanesulfonic acid and at least one further acid selected from the group consisting of hydrochloric acid, nitric acid, amidosulfonic acid and mixtures thereof makes it possible to obtain the corresponding mixtures in which the amount of radioactive elements after the method of the invention is low enough for the treated mixtures to be able to be processed further while complying with relevant legal obligations.

It is generally possible within the scope of the present invention to treat all mixtures which comprise radioactive elements. Preference is given according to the invention to treating ores or ore concentrates according to the invention.

The present invention therefore preferably provides the method of the invention in which the mixture is an ore or an ore concentrate.

Ores are generally obtained by mining of corresponding deposits. Ore concentrates are generally obtained from ores by removal of one or more component(s). The ores to be treated according to the invention can originate from any sources known to those skilled in the art, for example ores from underground deposits or open-cast pits.

In a further embodiment of the invention, other mixtures comprising radioactive elements, for example waste products or intermediates from other processes, e.g. the copper-comprising roasted pyrites obtained in sulfuric acid manufacture or filter dust or fly ash obtained in exhaust air purification, can also be treated by the method of the invention.

In a preferred embodiment, the radioactive element is selected from the group consisting of uranium-238, thorium-230, radium-226, lead-210, polonium-210, uranium-235, palladium-231, thorium-227, radium-228, thorium-228 and mixtures thereof.

There are generally further compounds or chemical elements, preferably of mineral origin, present in addition to the radioactive elements to be separated off in the mixtures to be treated according to the invention, especially in the ores or ore concentrates. Such compounds are, for example, oxides, hydroxides, phosphates, sulfates, sulfides, carbonates, silicates, fluates, fluorides, chlorides, aluminates or mixtures thereof of metals or semimetals of the Periodic Table of the Elements. Elements of this type are, for example, noble metals, which can be present in native form, in particular gold, silver, palladium or platinum.

Particularly preferred compounds or chemical elements which are present in addition to the radioactive elements to be separated off in the mixtures to be treated, especially ores or ore concentrates, are selected from the group consisting of copper, iron, sulfur, copper sulfide, $Al_2O_3$, $SiO_2$, CaO, $K_2O$, MgO, BaO, $U_3O_8$, Ag, As, Cd, Pb, Zn and mixtures thereof.

The desired product of the method of the invention is preferably a mixture, in particular an ore, whose content of radioactive elements is so low that it is below particular maximum limits, for example legally prescribed maximum limits. The desired product of the method of the invention comprises radioactive elements in an amount of, for example, less than 100 ppm by weight, more preferably less than 80 ppm by weight, particularly preferably less than 70 ppm by weight, in each case based on the main element of the decay chain, e.g. U238. The product of the method of the invention generally comprises radioactive elements in an amount of at least 1 ppb by weight. The preferred product of the method of the invention has a specific activity of less than 2.0 Bq per gram (Bq/g), preferably less than 1.8 Bq per gram (Bq/g), of radionuclide of the decay chain.

One radioactive element or a mixture of various radioactive elements can be present in the mixtures to be treated according to the invention.

In general, the mixture to be treated according to the invention, in particular ore or ore concentrate, comprises the radioactive elements to be separated off in such an amount that the mixture to be treated has a radioactivity, in each case based on the individual elements, of from 10 to 20 Bq/g, preferably from 15 to 19 Bq/g, for example based on the elements U-238, Th-230, Ra-226, Pb-210 or Po-210, or from 0.05 to 2.0 Bq/g, preferably from 0.1 to 1.0 Bq/g, for example based on the elements U-235, Pa-231, Th-227, Ra-228 or Th-228. In addition to the radioactive elements, the abovementioned compounds and/or chemical elements are preferably present. Further compounds and/or materials may also be present in the mixture to be treated according to the invention.

According to the invention, any alkanesulfonic acid known to those skilled in the art can generally be used.

In a preferred embodiment, the present invention provides the method of the invention, wherein the at least one alkanesulfonic acid is selected from the group consisting of cyclic, linear or branched alkanesulfonic acids whose alkyl radical has from 1 to 40 carbon atoms. These can be prepared by methods known to those skilled in the art, for example by sulfoxidation of the corresponding alkanes.

According to the invention, particular preference is given to using alkanesulfonic acids having short-chain alkyl radicals having from 1 to 3 carbon atoms, e.g. propyl, ethyl or methyl. Very particular preference is given to using methanesulfonic acid according to the invention.

The present invention therefore preferably provides the method of the invention, wherein methanesulfonic acid is used as alkanesulfonic acid.

According to the invention, it is also possible to use salts, for example alkali metal salts, of the sulfonic acids mentioned.

Furthermore, at least one further acid selected from the group consisting of hydrochloric acid, nitric acid, amidosulfonic acid and mixtures thereof is used according to the invention. The at least one further acid is, according to the invention, with hydrochloric acid being very particularly preferred.

The present invention therefore particularly preferably provides the method of the invention, wherein the at least one further acid is hydrochloric acid.

According to the invention, the at least one alkanesulfonic acid and the at least one further acid are preferably used as aqueous compositions.

The present invention therefore preferably provides the method of the invention, wherein the at least one alkanesulfonic acid and the at least one further acid are used as aqueous compositions.

According to the invention, it is possible for the at least one alkanesulfonic acid and the at least one further acid to be used in succession or together.

In the embodiment of the invention in which the at least one alkanesulfonic acid and the at least one further acid are used in succession, it is possible according to the invention for the mixture to be treated to be treated firstly with at least one alkanesulfonic acid and subsequently with at least one further acid. It is also possible according to the invention for the mixture to be treated firstly with at least one further acid and subsequently with at least one alkanesulfonic acid.

The present invention therefore preferably provides the method of the invention, wherein the mixture is treated firstly with at least one alkanesulfonic acid and subsequently with at least one further acid.

The present invention therefore preferably also provides the method of the invention, wherein the mixture is treated firstly with at least one further acid and subsequently with at least one alkanesulfonic acid.

In the embodiments of the invention in which the at least one alkanesulfonic acid and the at least one further acid are used in succession, these are preferably used as aqueous solutions.

The concentrations of the individual aqueous solutions can in each case have values which appear to be suitable to a person skilled in the art. The aqueous solution of the at least one alkanesulfonic acid, in particular methanesulfonic acid, preferably has a concentration of from 1 to 20% by weight, more preferably from 5 to 15% by weight, particularly preferably from 8 to 12% by weight, in each case based on the aqueous solution.

The aqueous solution of the at least one further acid preferably has a concentration of from 0.5 to 2 mol/l, preferably from 0.75 to 1.5 mol/l, very particularly preferably 1 mol/l, in each case based on the aqueous solution.

The present invention very particularly preferably provides the method of the invention, wherein an aqueous composition comprising at least one alkanesulfonic acid, in particular methanesulfonic acid, and at least one further acid, in particular hydrochloric acid, is used. In this embodiment of the invention, the mixture to be treated is treated simultaneously with at least one alkanesulfonic acid and at least one further acid.

The present invention preferably also provides the method of the invention, wherein a composition consisting of at least one alkanesulfonic acid, preferably methanesulfonic acid, at least one further acid, preferably hydrochloric acid, and water is used.

The aqueous composition for treating the mixture thus comprises water together with at least one alkanesulfonic acid and at least one further acid; the aqueous composition particularly preferably consists of water, at least one alkanesulfonic acid and at least one further acid.

In general, the at least one alkanesulfonic acid and the at least one further acid can in each case be present in any concentration which appears to be suitable to a person skilled in the art.

Very particular preference is given to using an aqueous composition which is based on a from 0.5 to 2 molar, preferably from 0.75 to 1.5 molar, very particularly preferably 1 molar, further acid, preferably hydrochloric acid, and preferably comprises from 1 to 20% by weight, more preferably from 5 to 15% by weight, particularly preferably from 8 to 12% by weight, of the at least one alkanesulfonic acid, in particular methanesulfonic acid. Further preference is given to no further components being present, so that this preferred aqueous composition consists of water, at least one further acid and at least one alkanesulfonic acid in the concentrations indicated.

In a further embodiment of the method of the invention, further additives can be present in addition to the abovementioned at least one alkanesulfonic acid and at least one further acid in the aqueous composition.

Suitable additives are, for example, selected from the group consisting of surfactants, complexing agents, microorganisms, for example bacteria, and mixtures thereof.

Surfactants can, for example, be selected from the group consisting of anionic, cationic, zwitterionic, nonionic surfactants and mixtures thereof.

Surfactants can, for example, be present in an amount of from 0.05 to 3.0% by weight, preferably from 0.1 to 2.0% by weight, in each case based on the total composition.

Complexing agents can generally be selected from among complexing agents known to those skilled in the art. Examples of complexing agents which may be present according to the invention are selected from the group consisting of methylglycinediacetic acid, ethylenediaminetetraacetic acid (EDTA), nitrilotriacetic acid (NTA), diethylenetriaminopentaacetic acid (DTPA), glutaminodiacetic acid (GLDA), hydroxyethyldiaminotriacetic acid (HEDTA), dimercaprol, dimercaptopropanesulfonic acid, dimercaptosuccinic acid and mixtures thereof. For the removal of polonium-210 in particular, dimercaprol, dimercaptopropanesulfonic acid, dimercaptosuccinic acid or a mixture thereof can advantageously be used.

Surfactants can, for example, be present in an amount of from 0.05 to 3.0% by weight, preferably from 0.1 to 2.0% by weight, in each case based on the total composition.

The method of the invention is preferably carried out in such a way that the mixture to be treated, preferably the ore or ore concentrate to be treated, is present, or is initially charged, as aqueous slurry.

The present invention therefore preferably provides the method of the invention, wherein the mixture, preferably the ore or ore concentrate to be treated, is present as aqueous slurry.

Further preference is given to the aqueous slurry of the mixture to be treated, preferably of the ore or ore concentrate to be treated, having a solids content of from 10 to 70% by weight, preferably from 15 to 60% by weight, more preferably from 18 to 22% by weight or from 50 to 60% by weight, in each case based on the aqueous slurry of the mixture, preferably of the ore or ore concentrate.

Further preference is given to the aqueous slurry of the mixture, preferably of the ore or ore concentrate, which is present then being treated with the above-described aqueous composition(s).

The method of the invention is generally carried out at a temperature of from 5 to 120° C., preferably from 20 to 100° C., particularly preferably from 55 to 80° C.

The treatment of the mixture, in particular of the ore or ore concentrate, is generally carried out until a sufficiently large amount of radioactive elements has been separated off for the desired concentration of the corresponding radioactive elements in the ore to be obtained. The method of the invention is preferably carried out for a time of from 2 to 48 hours, preferably from 4 to 30 hours, for example 6 or 24 hours. In the case of the combination of methanesulfonic acid and hydrochloric acid which is particularly preferred for the purposes of the invention, the treatment time can be particularly short.

The treatment of the mixture, preferably of the ore or ore concentrate, with the aqueous composition(s) as per the method of the invention can, in particular, also be carried out by leaching processes known to those skilled in the art. Leaching processes for digesting metal-comprising compounds or for removing part of these metal-comprising compounds are known in principle to those skilled in the art.

For the purposes of the present invention, leaching of the mixture to be treated, preferably the ore or ore concentrate, by the method of the invention preferably means that the mixture to be treated is, optionally after having been comminuted, made into a heap and the aqueous composition(s) then percolates/percolate or trickles/trickle through the heaped-up material. The mixture to be treated can also be sprayed with the aqueous composition(s). Spraying of the mixture to be treated is preferably carried out dropwise. After the method of the invention, the aqueous composition(s) used can preferably be used for further extraction operations.

In a preferred embodiment, the mixture to be treated is firstly milled before the method of the invention, so that particles having a diameter of from 0.5 μm to 100 μm, preferably from 1 μm to 100 μm, are obtained. The milled particles are then preferably made into a heap and treated as described above.

According to the invention, it is also possible for the aqueous composition(s) used according to the invention to comprise different concentrations of at least one alkanesulfonic acid and/or at least one further acid during the method of the invention (gradated mode of operation). In addition, any additives introduced, for example surfactants, can be added partly or in their entirety to the starting material, i.e. the mixture to be treated, even before commencement of the method of the invention, or else during milling of the mixture.

Depending on the mixture to be treated, it can also be preferred for this to be pretreated firstly with a concentrated sulfuric acid to effect wetting and the mixture subsequently to be leached with an excess of low-concentration sulfuric acid, as described in U.S. Pat. No. 4,120,935. In one embodiment of the invention, the mixture to be treated can be pretreated with concentrated sulfuric acid and subsequently be treated with at least one alkanesulfonic acid and at least one further acid selected from the group consisting of hydrochloric acid, nitric acid, amidosulfonic acid and mixtures thereof and/or surfactant. The concentrated sulfuric acid used for the pretreatment can also comprise alkanesulfonic acid and/or surfactant and/or alkanesulfonic acid salt.

When a dilute sulfuric acid is used for the pretreatment (wetting), the concentration of this is preferably from 10 to 250 g/l of $H_2SO_4$, particularly preferably from 20 to 150 g/l of $H_2SO_4$, in particular from 25 to 100 g/l of $H_2SO_4$.

The present invention also provides for the use of at least one alkanesulfonic acid and at least one further acid selected from the group consisting of hydrochloric acid, nitric acid, amidosulfonic acid and mixtures thereof for separating radioactive elements from mixtures comprising these.

As regards the individual features and the preferred embodiments of the use according to the invention, what has been said in respect of the method of the invention applies.

The present invention preferably provides the use according to the invention, wherein an aqueous composition consisting of at least one alkanesulfonic acid, at least one further acid and water is employed.

EXAMPLES

An ore concentrate from the Australian Olympic Dam is used as test substance. This typically has the following composition:

TABLE 1

| Component | Amount |
|---|---|
| Cu | 37.8% by weight |
| Fe | 27.1% by weight |
| S | 24.4% by weight |
| Copper sulfides | 1.55% by weight |
| $Al_2O_3$ | 1.77% by weight |
| $SiO_2$ | 5.29% by weight |
| CaO | 0.61% by weight |
| $K_2O$ | 0.45% by weight |
| MgO | 0.14% by weight |
| BaO | 0.15% by weight |
| $U_3O_8$ | 1390 ppm by weight |
| Ag | 64 ppm by weight |
| As | 392 ppm by weight |
| Cd | 15 ppm by weight |
| Pb | 260 ppm by weight |
| Zn | 200 ppm by weight |

The metals listed in table 1 are present as uraninite, coffinite, brannerite, uranothorite, thorianite, hematite, pyrite, chalcopyrite, bornite, chalcocite, bastnasite, florencite, monazite, xenotime, zircon, quartz, sericite, chlorite, fluorite, barite, siderite, feldspars, galena, altaite or clausthalite.

TABLE 2

Analysis of the composition obtained after the individual experiments

| No. | Aqueous composition | DNA U-238 ppm weight by | U-238 Bq/g | Gamma Th-230 Bq/g | Gamma Ra-226 Bq/g | Gamma Pb-210 Bq/g | Gamma Po-210 Bq/g | U-235 Bq/g | Gamma Pa-231 Bq/g | Gamma Th-227 Bq/g | Ra-228 Bq/g | Th-228 Bq/g |
|---|---|---|---|---|---|---|---|---|---|---|---|---|
| C1 (base case - $H_2SO_4$) | 80 g/l of $H_2SO_4$ | 1179 77 | 14.6 0.95 | 14.8 1.9 | 14.1 14.6 | 17.9 16.0 | 18.6 15.1 | 0.76 <0.08 | 0.72 0.57 | 0.75 0.58 | 0.16 0.17 | 0.16 0.04 |
| 2 (BASF-1A) | 5% by weight of MSA in $H_2SO_4$ | 50 | 0.61 | 2.4 | 15.3 | 13.6 | 17.6 | <0.06 | <0.17 | 0.45 | 0.18 | 0.04 |
| 3 (BASF-1B) | 10% by weight of MSA in $H_2SO_4$ | 48 | 0.59 | 1.8 | 15.5 | 12.9 | 12.3 | 0.03 | <0.15 | 0.50 | 0.17 | 0.04 |
| 4 (BASF-2A) | 20% by weight of MSA in $H_2SO_4$ | 46 | 0.57 | 2.5 | 15.4 | 15.6 | 16.8 | 0.03 | <0.14 | 0.56 | 0.19 | 0.04 |
| C5 (BASF-3A) | 100% by weight of MSA (2 h) | 202 | 2.5 | 3.8 | 4.1 | 6.0 | 16.7 | 0.13 | 0.14 | 0.18 | 0.06 | 0.05 |
| C6 (BASF-4A) | 100% by weight of MSA (24 h) | 53 | 0.66 | 1.3 | 1.3 | 2.1 | 13.1 | 0.030 | 0.29 | 0.60 | <0.010 | 0.012 |
| 7 (BASF-4B) | 10% by weight of MSA in 1M HCl | 33 | 0.41 | 0.95 | 0.72 | 1.6 | 14.2 | 0.019 | 0.17 | 0.048 | <0.011 | <0.010 |
| C8 (base case - HCl) | 1M HCl | 79 | 0.98 | 2.2 | 6.4 | 2.6 | 10.3 | 0.045 | — | 0.11 | — | — |

C1 is carried out using a solution of 80 g of $H_2SO_4$ in 1 l of water at a temperature of 70° C. for 24 hours at a solids content of the ore dispersion of 55% by weight.

C8 is carried out using a 1 molar hydrochloric acid in water at a temperature of 60° C. for 6 hours at a solids content of the ore dispersion of 20% by weight.

Experiments 2, 3 and 4 are carried out using a solution of 80 g of $H_2SO_4$ in 1 l of water and the corresponding amount of methanesulfonic acid (MSA) at a solids content of the ore dispersion of 55% by weight.

Experiment 7 is carried out in a 1 molar solution of HCl and the corresponding amount of methanesulfonic acid (MSA) at a solids content of the ore dispersion of 20% by weight. Since a large part of the acid was consumed during the experiment, concentrated hydrochloric acid was added after 2 hours.

Experiments C5 and C6 are carried out in pure methanesulfonic acid (MSA); the c(MSA) is 157 g/l.

Table 3 shows the amount of radionuclides extracted and of the metals present relative to the respective initial amounts.

TABLE 3

| | Extraction [%] | | | | | | |
|---|---|---|---|---|---|---|---|
| No. | U-238 | Th-230 | Ra-226 | Pb-210 | Po-210 | Cu | Pb | U |
| C1 | 93.7 | 83.7 | 1.6 | 16.6 | 21.8 | 0.1 | 7.4 | 93.7 |
| 2 | 96.4 | 86.1 | 7.0 | 34.9 | 18.9 | 4.2 | 17.6 | 96.4 |
| 3 | 96.4 | 89.1 | 1.9 | 35.7 | 41.0 | 6.2 | 17.6 | 96.2 |
| 4 | 96.4 | 84.6 | 0.7 | 20.8 | 17.9 | 3.9 | 12.6 | 96.4 |
| C5 | 81.3 | 74.3 | 71.6 | 67.3 | 12.4 | 0.2 | 36.2 | 78.1 |
| C6 | 96.1 | 92.4 | 92.0 | 89.8 | 39.0 | 2.8 | >99 | 96.1 |
| 7 | 97.8 | 93.6 | 94.9 | 91.1 | 23.6 | 13.6 | >99 | 97.8 |

The invention claimed is:

1. A method of separating a radioactive element from a mixture, the method comprising:
   treating the mixture with at least one alkanesulfonic acid and at least one further acid selected from the group consisting of hydrochloric acid, nitric acid, amidosulfonic acid and a mixture thereof, such that at least one radioactive element is separated from the mixture, wherein:
   the mixture is an ore or an ore concentrate; and
   the at least one radioactive element separated from the mixture is selected from the group consisting of uranium-238, uranium-235, thorium-230, thorium-227, lead-210, radium-226 and mixtures thereof.

2. The method according to claim 1, wherein the at least one alkanesulfonic acid and the at least one further acid are aqueous compositions.

3. The method according to claim 1, wherein the mixture is treated firstly with the at least one alkanesulfonic acid and subsequently with the at least one further acid.

4. The method according to claim 1, wherein the mixture is treated firstly with the at least one further acid and subsequently with the at least one alkanesulfonic acid.

5. The method according to claim 1, wherein methanesulfonic acid is used as the at least one alkanesulfonic acid.

6. The method according to claim 1, wherein the mixture is treated with an aqueous composition comprising the at least one alkanesulfonic acid and the at least one further acid.

7. The method according to claim 1, wherein the mixture is treated with an aqueous composition consisting of the at least one alkanesulfonic acid, the at least one further acid, and water.

8. The method according to claim 1, wherein the mixture is an ore concentrate.

9. The method according to claim 1, wherein the radioactive element is selected from the group consisting of uranium-238, thorium-230, uranium-235, thorium-227, thorium-228 and mixtures thereof.

10. The method according to claim 1, wherein the mixture is an aqueous slurry.

11. The method according to claim 1, wherein the mixture is treated with an aqueous composition comprising from 0.5 to 2 moles of hydrochloric acid and from 1 to 20% by weight of methanesulfonic acid.

12. The method according to claim 1, wherein the further acid is hydrochloric acid.

* * * * *

UNITED STATES PATENT AND TRADEMARK OFFICE
CERTIFICATE OF CORRECTION

PATENT NO. : 10,435,766 B2
APPLICATION NO. : 15/546086
DATED : October 8, 2019
INVENTOR(S) : Henning Urch et al.

Page 1 of 1

It is certified that error appears in the above-identified patent and that said Letters Patent is hereby corrected as shown below:

In the Specification

Column 7, Line 41, "g/I." should read -- g/l. --

Signed and Sealed this
Twenty-fourth Day of November, 2020

Andrei Iancu
*Director of the United States Patent and Trademark Office*